Figure 5:
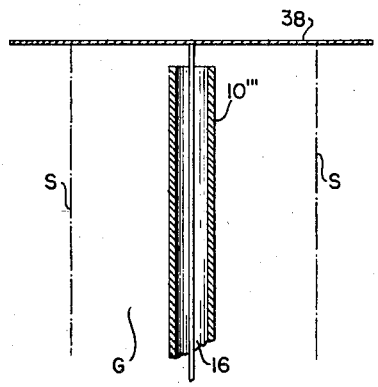

March 30, 1948.  H. A. WHEELER  2,438,795
WAVE-GUIDE SYSTEM
Filed Dec. 13, 1943  2 Sheets-Sheet 1
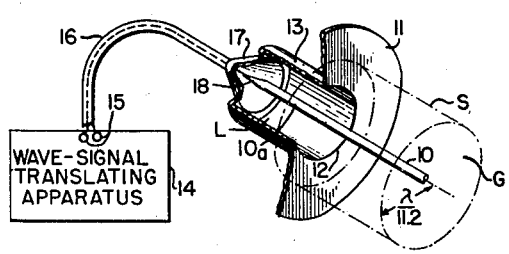
INVENTOR
HAROLD A. WHEELER
BY
ATTORNEY March 30, 1948. H. A. WHEELER 2,438,795
WAVE-GUIDE SYSTEM
Filed Dec. 13, 1943 2 Sheets-Sheet 2

INVENTOR
HAROLD A. WHEELER
BY *Harry B. Page*
ATTORNEY

Patented Mar. 30, 1948

2,438,795

UNITED STATES PATENT OFFICE 2,438,795

WAVE-GUIDE SYSTEM

Harold A. Wheeler, Great Neck, N. Y., assignor, by mesne assignments, to Hazeltine Research, Inc., Chicago, Ill., a corporation of Illinois Application December 13, 1943, Serial No. 514,071

15 Claims. (Cl. 178—44)

The present invention relates to wave-guide systems and particularly to such systems of the open wave-guide type for translating wave signals of predetermined wave length.

It is frequently desirable to translate high-frequency wave signals over a single conductor between two points spaced by a distance of several or many wave lengths. For example, in commercial power networks one of the power conductors may be used not only to conduct low-frequency power but also as a conductor of relatively high-frequency wave signals. Such wave signals may be modulated with speech signals to be transmitted to one or more points along the power line or they may be modulated with control-signal pulses by which to effect remote control of power equipment. Heretofore such systems in general have utilized wave lengths much longer than the height of the line above ground so they have required the ground as a return circuit for wave-signal currents. Both the transmitter and the receiver of such wave-signal systems are merely coupled between the transmission line conductor and ground through suitable blocking condensers which isolate the equipment from the high transmission-line voltages usually employed in power transmission. The efficiency of this method of wave-signal transmission is limited by several factors. For instance, there is a substantial energy loss by the resistance which the ground presents to the conduction of wave-signal currents. There is, additionally, a substantial loss of wave-signal energy by virtue of the impedance mismatches inherently existing between the wave-signal translating apparatus and the wave-signal conductive circuit when coupled as described.

It would be desirable in these cases of wave-signal transmission over power lines that one conductor of the line be employed as an open wave guide at wave lengths less than the height of the line above ground, thus concentrating the wave-signal energy near the line and dispensing with the need that the ground function as a return conductor. This avoids ground losses and leads to relatively high efficiency of wave-signal transmission. Also, it would be desirable that wave-signal energy loss caused by impedance mismatch between wave-signal translating apparatus and the power-line conductor be minimized or entirely avoided.

On the other hand, there are numerous other applications in which it is undesirable that any energy be propagated along the outside of an open conductor. For example, if a coaxial transmission line is used to couple wave-signal translating apparatus with a wave-signal antenna, the outer conductor of the line may resonate and thereby undesirably absorb wave-signal energy from the antenna. This not only results in substantial loss of wave-signal energy, but in many applications undesirably affects the directive characteristic desired of the antenna. The same situation prevails where the antenna is supported at the end of a conductive mast. It has heretofore been proposed in such cases that the exposed conductor be shielded from the antenna by the provision, at the base of the latter, either of a large conductive disc or a plurality of quarter-wave length conductors extending radially from the antenna and the exposed conductor. The latter arrangement is not as efficient in this respect as is desirable and an improved wave shield of this nature is disclosed and claimed in the copending application of Harold A. Wheeler, Serial No. 514,072, now Patent No. 2,425,585 dated August 12, 1947, filed concurrently herewith, entitled Wave-signal antenna, and assigned to the same assignee as the present application. The conductive shield disc has the disadvantage that its physical size must be unduly large if it is to be effective.

In yet another field of application, it is desirable that wave-signal energy be propagated along an exposed conductor one or more wave lengths long and that the wave-signal propagation be abruptly terminated at some point on the conductor without reflection from the point of termination; in other words, that the conductor operate without resonance or standing waves. An example of this nature is wave-signal apparatus used to test the efficiency of wave-signal shields of the type hereinbefore mentioned. Here wave signals are propagated along an open conductor to a wave-signal shield and the strength of the energy passing beyond the shield is observed as a measure of the shield efficiency. Any standing waves developed on the open conductor, as by reflection of wave-signal energy from the point of termination, renders the placement of the shield along the conductor critical both as to positioning and as to the wave-signal frequency and thus is likely to produce errors in the observed results.

It is an object of the present invention, therefore, to provide a new and improved wave-guide system of the type described which avoids one or more of the limitations and disadvantages of prior systems of this general type.

It is an additional object of the invention to provide a new and improved wave-guide system which effects optimum transfer of wave-signal energy in at least one direction of wave-signal propagation.

It is a further object of the invention to provide a wave-guide system of the open wave-guide type in which the propagation of wave signals is terminated along the wave guide without regard to the termination of the wave-guide conductor itself at that point or at a point therebeyond.

It is an additional object of the invention to provide a new and improved wave-guide system of the open wave-guide type which minimizes reflection of wave-signal energy tending to occur at the point of termination of the wave guide.

It is a further object of the invention to provide a wave-guide system in which the wave guide conductor thereof may function both as the outer conductor of a coaxial transmission line to translate wave-signal energy internally thereof and as an open wave-guide conductor to translate wave-signal energy along the exterior surface thereof, the directions of propagation of wave signals within and without the conductor being completely independent.

In accordance with the invention, therefore, a wave-guide system for translating wave signals of predetermined wave length comprises an open wave guide including an elongated conductor spaced by at least one-quarter wave length from any conductive mass, an electrically conductive structure providing normal to the conductor a wave-signal path having impedance to space much less than the image impedance of the wave guide, and impedance means having a value of impedance approximately matching the image impedance of the wave guide for coupling the structure and the conductor to effect optimum transfer of wave-signal energy through the wave guide in at least one direction.

For a better understanding of the present invention, together with other and further objects thereof, reference is had to the following description taken in connection with the accompanying drawings, and its scope will be pointed out in the appended claims.

Referring to the drawings, Fig. 1 represents a wave-guide system embodying the present invention in a particular form; Figs. 2 and 3 represent modified forms of the invention; Fig. 4 represents a complete wave-guide system of a particular form; and Figs. 5–8, inclusive, represent additionally modified forms of the invention.

Referring now more particularly to Fig. 1, there is represented, partly schematically, a wave-guide system embodying the present invention in a particular form adapted to translate wave signals of predetermined wave length. This system comprises an open wave guide G including an elongated linear conductor 10 spaced by at least one-quarter wave length from any conductive mass, for example the ground. The system includes an electrically conductive structure providing normal to the conductor 10 a wave-signal path having impedance to space much less than the image impedance of the wave guide G. In particular, this structure comprises a conductive apertured or annular disc 11 at least one-half wave length in diameter. The disc is positioned in coaxial relation with the conductor 10 and the aperture 12 of the disc has a diameter somewhat larger than that of the conductor so that the disc does not engage the latter. The wave-guide system also includes impedance means having a value of impedance approximately matching the image impedance of the wave guide G for coupling the structure or disc 11 and the conductor 10 to effect optimum transfer of wave-signal energy through the wave guide in at least one direction. The last-mentioned means comprises a conductive cylinder 13 positioned coaxially of the conductor 10 to provide in conjunction with the end portion 10a of the latter a sectional coaxial transmission line L. One end of the cylinder 13 is conductively connected to the apertured edge of the disc 11. A wave-signal translating apparatus 14, which may be either a wave-signal receiver or a wave-signal transmitter, has wave-signal circuit terminals 15 coupled through a coaxial transmission line 16 and through the sectional line L to the wave guide G, a conical flared-end portion 17 of the outer conductor of the line 16 cooperating with a conical tapered-end portion 18 of the conductor 10 to maintain the line impedance constant to the point of its connection with the sectional line L.

It will be understood that the wave-guide system may include a similar arrangement of elements 11–18, inclusive, at the other end of the conductor 10, such being omitted from Fig. 1 for purposes of simplicity.

Considering now the operation of the wave-guide system just described, and assuming that the wave-signal translating apparatus 14 is a wave-signal transmitter, wave signals generated by the latter unit are translated through the transmission line 16 and the sectional transmission line L to the open wave guide G where they are propagated along the exterior surface of the conductor 10 acting as an open wave guide. As explained in a paper by Schelkunoff, published in the September 1941 issue of the Proceedings of the Institute of Radio Engineers, pages 493–521, and particularly as shown by Equation 166 of this paper, a conductor operating in this manner has a characteristic impedance the value of which is the same as though a conductive virtual sheath S of radius approximately one-eleventh wave length surrounded it to form a coaxial transmission line. In particular, the wave guide G has a characteristic impedance of approximately 136 ohms when the conductor 10 has a diameter of approximately one fifty-fifth wave length. While this concept of the virtual sheath S is arrived at by considering the electric field which extends into all space about the conductor 10, the electric field is primarily concentrated within the sheath S and near the conductor 10. The disc 11 extends transversely of the sheath S on each side thereof, the outer diameter of the disc being at least two or three times the diameter of the sheath, to provide a conductive surface on which the major portion of the electric flux about the conductor 10 at the end of the latter may be terminated. At the same time, the disc 11 provides a shield for the magnetic field existing about the conductor 10 at the terminated end thereof, thus also to furnish a boundary for the magnetic flux at the end of the conductor 10. Essentially, then, the disc 11 provides an electromagnetic wave shield at the terminated end of the coaxial transmission line which comprises the conductor 10 and sheath S. To prevent reflection of wave-signal energy from the end of the transmission line 16, which would prevent optimum transfer of wave-signal energy to the open wave guide G, it is necessary that the line 16 be terminated in its image impedance. This is accomplished by making the sectional line L an odd number of quarter-wave lengths long and so selecting the inside diameter of the cylinder 13 with relation to the outside diameter of the conductor 10 that the sectional line L has a characteristic or surge impedance equal to the geometric mean impedances of the transmission line 16 and the open wave guide G. When this is done, the sectional transmission line L operates as an impedance transformer to transform the higher value of impedance of the open wave guide G to a lower value corresponding to that of the transmission line 16 so that the latter operates into its image impedance, thus to effect optimum transfer of wave-signal energy from the transmission line 16 to the open wave guide G.

Now it will be assumed, contrary to the assumption first made, that the wave-signal translating apparatus 14 comprises a wave-signal receiver and that the input circuit thereof, comprising the terminals 15 has only a resistive component of impedance and terminates the transmission line 16 in its image impedance. Under this assumed condition, the sectional transmission line L again operates as an impedance transformer but this time to transform the characteristic impedance of the transmission line 16 to a value corresponding to that of the open wave guide G so that the latter is properly terminated in its image impedance. This minimizes reflection of wave-signal energy at the point of termination with the result that optimum transfer of wave-signal energy through the wave guide is effected in the direction from the wave guide to the transmission line 16.

The disc 11 in this arrangement has an impedance to space much lower than the image impedance of the wave guide G and provides an effective low impedance ground plane on which to terminate adjacent ends of the line L and wave guide G.

Fig. 2 represents a wave-guide system essentially similar to that of Fig. 1, similar elements being designated by similar reference numerals and analogous elements by similar reference numerals primed, except that the sectional transmission line L' of the present system is of the exponentially tapered type and comprises an exponentially tapered conductor 13' of circular cross section positioned coaxially of the conductor 10 and having a flared edge portion 19 in spaced relation to the conductive disc 11 to provide therebetween a condenser 20. The exponentially tapered type of transmission line is disclosed and claimed in the United States Letters Patent to Harold A. Wheeler, No. 2,204,712, granted June 18, 1940, entitled Uniform impedance network, and assigned to the same assignee as the present application. A transmission line of this type is also described in a paper entitled "Transmission lines with exponential taper" by Harold A. Wheeler in the January, 1939 issue of the Proceedings of the Institute of Radio Engineers. In order that the sectional line L' shall have a line impedance equivalent to a pure resistance which varies with frequency, a short length of coaxial transmission line 21, short-circuited at its remote end, is coupled across the end of the sectional line L' remote from the disc 11. The appropriate characteristic impedance and length of the transmission line 21 to be used and the value of capacitance 20 are related to the physical dimensions of the tapered conductor 13' and to the diameter of the conductor 10 as explained in the aforementioned Wheeler patent and paper. The operation of this modified form of wave guide is essentially similar to that of Fig. 1 and will not be repeated.

The wave-guide system of Fig. 3 is essentially similar to that of Fig. 1, similar elements being designated by similar reference numerals and analogous elements by similar reference numerals double primed, except that the sectional transmission line L" is an even number of half-wave lengths long and is short-circuited at its end remote from the disk 11. The coaxial transmission line 16 is coupled to the sectional transmission line L" at a point thereon an odd number of quarter-wave lengths from the disc 11. A wedge-shaped conductive member 22 is used at the end of the transmission line 16 to maintain substantially uniform impedance up to its point of connection with the sectional line L".

The conductor 10 of the Fig. 3 system may, for example, be one conductor of a high-voltage power-transmission line. To protect the wave-signal translating apparatus 14 from such high voltages, a high-voltage coaxial condenser 23 is employed between the wave-guide system and the unit 14. This condenser comprises conical housing members 24, 24 having flared edge portions 25, 25 separated by a dielectric 26 of suitable material and thickness to withstand the voltages present on the conductor 10. The conical housing members 24, 24 are individually connected to the adjacent ends of the outer conductor of the transmission line 16. The condenser 23 also includes inner conical conductive members 27, 27 positioned on opposite sides of the dielectric 26 and supported coaxially of the housing members 24, 24. The members 27, 27 have planar conductive bases to provide substantial capacitance between the members. These inner members 27, 27 are individually connected to adjacent ends of the inner conductor of the transmission line 16.

The operation of this form of wave-guide system is essentially similar to that of Fig. 1; the condenser 23, the transmission line 16, and the sectional line 13" are effective to couple the wave-signal translating apparatus 14 to the open wave guide G. The sectional line L" preferably has a characteristic impedance equal to the geometric mean impedance of the transmission line 16 and open wave guide G, whereby the sectional line portion Lₐ" transforms the impedance of the line 16 to that of the open wave guide, or vice versa, thus to terminate each in its image impedance. The portion Lᵦ" of the sectional line L" between its short-circuited end and the point of its connection with the line 16 is an odd number of quarter-wave lengths long and thus presents infinite impedance to wave signals translated between the line 16 and wave guide G. This is effective to prevent the propagation of wave-signal energy along the conductor 10 beyond the short-circuited end of the sectional line L". The operation of this modified form of wave-guide system is otherwise essentially similar to that of Fig. 1 and will not be repeated.

In the wave-guide system last described, the sectional transmission line L" and transmission line 16 comprise impedance means having a value of impedance approximately matching the image impedance of the open wave guide G for coupling the conductive disc 11 and the conductor 10 to effect optimum transfer of wave-signal energy through the wave guide G in at least one direction. The short-circuited end of the cylindrical conductor 13" comprises means utilizing a length of the conductor 10 extending from the impedance means last mentioned and on the opposite side thereof from the path of wave-signal propagation along the conductor 10 for providing a transmission line coupled in shunt to at least a portion of such impedance means and short-circuited an odd number of quarter-wave lengths distant therefrom substantially to prevent the propagation of wave-signal energy along the conductor 10 beyond the short-circuited end of the last-mentioned transmission line.

An antenna having a resonant wave-signal shield is disclosed and claimed in the above-mentioned copending application of Harold A. Wheeler. This resonant wave-signal shield includes radial resonant arms which are electrically connected to an exposed conductor in open space and extending from the antenna. It is the function of the shield to prevent the absorption of wave-signal energy from the antenna by the exposed conductor, which may be a conductive supporting mast for the antenna or the outer conductor of a concentric transmission line. The arms of this shield have a critical length best ascertained by measurement of the effectiveness of the shield in terminating the propagation of wave-signal energy along the exposed conductor.

A wave-guide system suitable for determining the optimum lengths of such wave-shield arms is shown in Fig. 4, which is essentially similar to the system of Fig. 1 and similar elements are designated by similar reference numerals and analogous elements by similar reference numerals triple primed. In the Fig. 4 system, the transmission line 16 is preferably of the rigid type and the resonant wave-signal shield 28, the effectiveness of which is to be measured, is supported on the outer conductor of the line 16 preferably midway between two conductive apertured discs 11a and 11b supported coaxially of the line 16 and preferably spaced from each other by several wave lengths. A conductive cylinder 13a''' is secured to the apertured edge of the disc 11a and forms with the outer conductor 10''' of the line 16 a coaxial sectional transmission line La''' an odd number of quarter-wave lengths long and short-circuited at its remote end by a flanged disc 29a. The disc 29a is manually movable by means of a rod 30a to adjust the length of the sectional line La'''. The inner conductor of the transmission line 16 is coupled to the cylinder 13a''' by a resistor 31 to effect the transfer of wave-signal energy, generated by a wave-signal generator 14, from the line 16 to the sectional line La''' and therethrough to the open wave guide G, thus to effect the propagation of wave-signal energy along the outer conductor of the line 16. The wave guide G is terminated in the region of the disc 11a by resistors 32, 32 connected between the apertured edge of the disc 11a and the conductor 10''', these resistors having values which in parallel equal the characteristic impedance of the wave guide.

A similar sectional transmission line Lb''' closes the aperture in the disc 11b. This latter line comprises a cylindrical conductive cylinder 13b''', secured to the apertured edge of the disc 11b in coaxial relation with the conductor 10''', and a flanged shorting disc 29b with adjusting rod 30b. This sectional transmission line also is adjusted to have a length of an odd number of quarter-wave lengths. Resistors 34, 34 are connected between the apertured edge of the disc 11b and the conductor 10''' and have values in parallel equal to the characteristics impedance of the open wave guide G. A pick-up loop 35 extends through an aperture 36 provided near the apertured edge of 11b and is coupled by conductors 37 to suitable measuring apparatus, not shown.

The system just described is initially adjusted for operation by adjustment of the sectional lines La''' and Lb''' to have an effective electrical length of one-quarter wave length and by proper selection of the values of the resistors 32, 32 and 34, 34. This is accomplished by the following procedure. Wave signals generated by the generator 14 are translated through the line 16 and are coupled by the resistor 31 to the sectional line La''' and thereafter are propagated along the inductor 10''' operating as an open wave guide G. The resonant wave-signal shield 28 is preferably removed from the system at this time so that the wave-signal energy propagates through the wave guide G to the disc 11b. The flanged disc 29b is now manually adjusted by means of rod 30b until minimum voltage is induced in the pick-up loop 35, the resistors 34, 34 being preferably temporarily disconnected to render the adjustment more critical. The sectional line Lb''' has an electrical length of an odd number of quarter-wave lengths under the condition of minimum induced voltage in the pick-up loop 35. Resistors 34, 34 of various values are now connected in place and the elements 11b, 13b,''' and 29b are moved in unison along the conductor 10''' while observing the ratio of maximum to minimum induced voltage in the pick-up loop 35, suitable means, not shown, being employed by which the resistors 34, 34 may move with the disc 11b while maintaining their electrical connection to the conductor 10'''. The ratios of maximum to minimum induced voltages for various values of the resistors 34, 34 are plotted. The optimum value for the resistors 34, 34 is determined from this plot as that value which provides approximately unity ratio. This value of resistance, it will be apparent, is the one which terminates the open wave guide G at the disc 11b in the image impedance of the guide, thus minimizing the production of standing waves along the conductor 10'''.

In adjusting the sectional line La''', a slightly different procedure is followed in that the resistors 32, 32 are given any selected value and the ratio of the maximum to the minimum induced voltage in the pick-up loop 35 is observed as the wave shield 28 is moved along the conductor 10'''. These ratios of induced voltage vary both with the values of the resistors 32, 32 and with the length of the sectional line La'''. The induced-voltage ratios are plotted against the length of the sectional line La''', there being one such plot for each selected value of the resistors 32, 32. The optimum value for the resistors 32, 32 and the optimum length of the sectional line La''' is that which produces the smallest ratio of induced voltage in the pick-up loop 35. All of these adjustments described insure a minimum standing wave ratio along the conductor 10''' and render the placement of the resonant wave-signal shield along the conductor 10''' noncritical both as to positioning and to the wave-signal frequency, and thus increase the accuracy of the observed results. The discs 11a and 11b, with their quarter-wave short-circuited sectional lines La''' and Lb''', effectively terminate the open wave guide thus provided and prevent the propagation of wave-signal energy along the conductor 10''' beyond the short-circuited ends of the sectional lines.

The cooperative arrangement of the apertured disc 11b, the sectional line Lb''', and the resistors 34, 34 may aptly be called a "wave sink." That is, the purpose of this arrangement is to absorb all wave-signal energy propagated to it along the conductor 10''', thereby to prevent the propagation of wave-signal energy along the conductor 10''' beyond the short-circuited end of the sectional line $L_b'''$. This "wave sink" has utility in numerous applications. For example, when a shielded transmission line is used to energize a wave-signal antenna, the conductive shield of the line tends to act as an open wave guide having resonant properties which, under certain resonant conditions, may cause the shield to absorb appreciable wave-signal energy from the antenna. A "wave sink" of the type described may be positioned on the transmission line, in electrical engagement with its conductive shield, to render the shield nonresonant, thus to minimize the absorption of wave-signal energy by the shield from the antenna.

Where in a wave-guide system of the Fig. 4 type it is desired that the coaxial transmission line 16 terminate in the region of the disc 11a rather than to extend therebeyond as shown, the arrangement of Fig. 5 may be employed. In the latter, a conductive disc 38 preferably somewhat larger than one-half wave length in diameter is supported at the end of the transmission line 16 and is connected at its center to the inner conductor thereof. The outer conductor 10''' of the line 16 terminates a short distance from the disc 38. The disc 38 forms with the end of the conductor 10''' a particular form of coaxial transmission line having values of impedance which are low in the immediate vicinity of the end of the transmission line 16, and are approximately equal to the characteristic impedance of the latter, and which progressively increase to a maximum value near the outer edge of the disc 38 where they are approximately equal to the characteristic impedance of the open wave guide G. The outer annular area of the disc 38, having radial depth of approximately one-quarter wave length, comprises an electrically conductive structure providing normal to the conductor 10''' a wave-signal path having impedance to space much less than the image impedance of the wave guide G. The region of the disc extending from the end of the inner conductor of the line 16 to the sheath S thus co-operates with the end portions of the conductor 10''' and the line 16 to provide an impedance means having a value of impedance which progressively increases from the center of the disc outwardly approximately to match the image impedance of the wave guide G to that of the line 16. This impedance match is effected in similar manner to an impedance match provided by a tapered transmission line such as described in applicant's aforementioned I. R. E. paper. It is the purpose of the impedance means last mentioned so to couple the wave guide and the line as to effect optimum transfer of wave-signal energy therebetween. Consequently, both the coaxial transmission line 16 and the open wave guide G effectively are terminated in their image impedances when looking toward the disc 38 with the result that optimum transfer of wave-signal energy is effected between the transmission line and the open wave guide.

Figure 6:
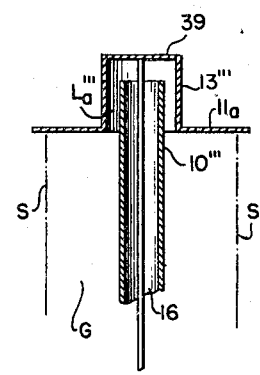

Fig. 6 represents the manner in which the Fig. 5 arrangement may be modified to make it similar to that of Fig. 4. Elements of Fig. 6 corresponding to similar elements of Fig. 4 are designated by similar reference numerals. In the Fig. 6 arrangement, it will be seen that the center conductor of the transmission line 16 is electrically connected to the center of a disc 39 which provides a short circuit for the end of the sectional transmission line $L_a''''$. The outer conductor 10'''' of the line 16 terminates a short distance from the disc 39. The sectional transmission line $L_a''''$ has a characteristic impedance equal to the geometric mean impedance of the transmission line 16 and the open wave guide G, thus to terminate the transmission line 16 and the open wave guide in their image impedances.

Figure 7:
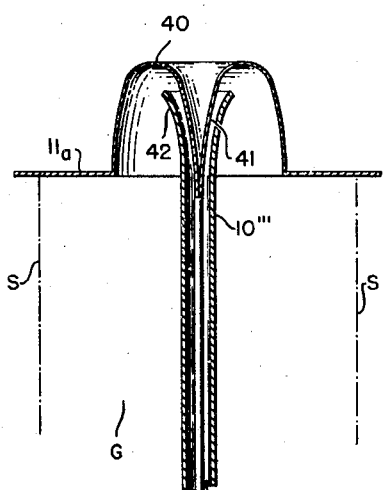
Figure 8:
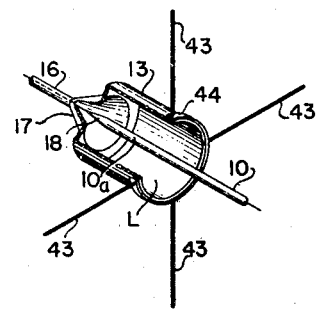

The arrangement of Fig. 7 is essentially similar to that of Fig. 6 except that the aperture of the disc 11a is closed by a conductive member 40 of approximate frusto-conical configuration and having a re-entrant conical portion 41 positioned in coaxial relation with a flared end portion 42 of the conductor 10''''. The center conductor of the transmission line 16 is electrically connected to the apex of the re-entrant conical portion 41 of the member 40. The flared end portion 42 of the conductor 10'''' and the conical re-entrant portion 41 of the member 40 essentially form an approximately exponential coaxial transmission line similar to that of the Fig. 2 arrangement. The configuration of the flared end portion 42 of the conductor 10'''' and the configuration of the member 40 are such that the transmission line 16 and the open wave guide G are each terminated in their image impedances thus to effect optimum transfer of wave-signal energy therebetween.

While the unitary electrically conductive structure of the wave-guide system, this structure providing a wave-signal path having impedance to space much less than the image impedance of the open wave guide, has hereinbefore been disclosed and described as an apertured conductive disc 11, it will be apparent that other similar structures for providing such wave-signal path may be employed. Thus, in the arrangement of Fig. 8 which is essentially similar to that of Fig. 1, a plurality of wave-signal paths of low impedance to space are provided by a plurality of radial conductive rods 43 which are electrically and mechanically connected to a collar 44 inserted over the end of the conductive cylinder 13. The conductive rods 43 preferably have an effective electrical length of an odd number of quarter-wave lengths in order that they shall have series resonance at the wave-signal frequency. They have the same characteristics and exhibit the same mode of operation as the conductive disc 11 of the Fig. 1 arrangement. The operation of the Fig. 8 system is essentially similar to that of Fig. 1 and will not be repeated.

From the above description of the invention, it will be apparent that a wave-guide system embodying the invention has the advantages that the open wave guide is terminated at a selected point without regard to the termination of the wave-guide conductor at that point and such termination is effected with minimum reflection of wave-signal energy from the point of termination. There is the additional advantage that a wave-guide system embodying the invention effects optimum transfer of wave-signal energy through the open wave guide in at least one direction. A particular form of the invention has the important advantage that the conductor of the open wave-guide system may function both as the outer conductor of a coaxial transmission line to translate wave-signal energy internally thereof and may additionally function as an open wave guide to translate wave-signal energy along the exterior surface thereof, the propagation of wave signals within and without the conductor occurring either in the same or in opposite directions as desired.

While there have been described what are at present considered to be the preferred embodiments of this invention, it will be obvious to those skilled in the art that various changes and modifications may be made therein without departing from the invention, and it is, therefore, aimed in the appended claims to cover all such changes and modifications as fall within the true spirit and scope of the invention.

What is claimed is:

1. A wave-guide system for translating wave signals of predetermined wave length comprising, an open wave guide including an elongated conductor spaced by at least one-quarter wave length from any conductive mass, an electrically conductive structure providing normal to said conductor a wave-signal path having impedance to space much less than the image impedance of said wave guide, and impedance means having a value of impedance approximately matching said image impedance for coupling said structure and said conductor to effect optimum transfer of wave-signal energy through said wave guide in at least one direction.

2. A wave-guide system for translating wave signals of predetermined wavelength comprising, an open wave guide including an elongated conductor spaced by at least one-quarter wave length from any conductive mass, an electrically conductive structure providing normal to said conductor a plurality of wave signal paths each having impedance to space much less than the image impedance of said wave guide, and impedance means having a value of impedance approximately matching said image impedance for coupling said structure and said conductor to effect optimum transfer of wave-signal energy through said wave guide in at least one direction.

3. A wave-guide system for translating wave signals of predetermined wave length comprising, an open wave guide including an elongated conductor spaced by at least one-quarter wave length from any conductive mass, a conductive apertured disc positioned around said conductor in coaxial relation therewith but spaced therefrom and providing normal thereto a wave-signal path having impedance to space much less than the image impedance of said wave guide, and impedance means having a value of impedance approximately matching said image impedance for coupling the apertured edge of said disc and said conductor to effect optimum transfer of wave-signal energy through said wave guide in at least one direction.

4. A wave-guide system for translating wave signals of predetermined wave length comprising, an open wave guide including an elongated conductor spaced by at least one-quarter wave length from any conductive mass, a conductive apertured disc at least one-half wave length in diameter positioned around said conductor in coaxial relation therewith but spaced therefrom and providing normal thereto a wave-signal path having impedance to space much less than the image impedance of said wave guide, and impedance means having a value of impedance approximately matching said image impedance for coupling the apertured edge of said disc and said conductor to effect optimum transfer of wave-signal energy through said wave guide in at least one direction.

5. A wave-guide system for translating wave signals of predetermined wave length comprising, an open wave guide including a linear conductor spaced by at least one-quarter wave length from any conductive mass, an electrically conductive structure providing normal to said conductor a wave-signal path having impedance to space much less than the image impedance of said wave guide, and impedance means having a value of impedance approximately matching said image impedance for coupling said structure and said conductor to effect optimum transfer of wave-signal energy through said wave guide in at least one direction.

6. A wave-guide system for translating wave signals of predetermined wave length comprising, an open wave guide including an elongated conductor spaced by at least one-quarter wave length from any conductive mass, an electrically conductive structure providing normal to said conductor a wave-signal path having impedance to space much less than the image impedance of said wave guide, and resistive means having a value of resistance approximately matching said image impedance for coupling said structure and said conductor to effect optimum transfer of wave-signal energy through said wave guide in at least one direction.

7. A wave-guide system for translating wave signals of predetermined wave length comprising, an open wave guide including an elongated conductor spaced by at least one-quarter wave length from any conductive mass, an electrically conductive structure providing normal to said conductor a wave-signal path having impedance to space much less than the image impedance of said wave guide, impedance means having a predetermined value of impedance, and means utilizing a length of said conductor extending from said structure on the opposite side thereof from the path of wave-signal propagation along said conductor for providing a transmission line an odd number of quarter-wave lengths long coupling said impedance means between said structure and said conductor, said transmission line having a characteristic impedance approximately equal to the geometric mean impedance of said impedance means and said wave guide to effect optimum transfer of wave-signal energy through said wave guide in at least one direction.

8. A wave-guide system for translating wave signals of predetermined wave length comprising, an open wave guide including an elongated conductor spaced by at least one-quarter wave length from any conductive mass, an electrically conductive structure providing normal to said conductor a wave-signal path having impedance to space much less than the image impedance of said wave guide, impedance means having a value of impedance approximately matching said image impedance for coupling said structure and said conductor to effect optimum transfer of wave-signal energy through said wave guide in at least one direction, and means utilizing a length of said conductor extending from said impedance means on the opposite side thereof from the path of wave-signal propagation along said conductor for providing a transmission line coupled in shunt to at least a portion of said impedance means and short-circuited an odd number of quarter-wave lengths distant therefrom substantially to prevent the propagation of wave-signal energy along said conductor beyond the short-circuited end of said transmission line.

9. A wave-guide system for translating wave signals of predetermined wave length comprising, an open wave guide including an elongated conductor spaced by at least one-quarter wave length from any conductive mass, an electrically conductive structure providing normal to said conductor a wave-signal path having impedance to space much less than the image impedance of said wave guide, a first transmission line having a predetermined characteristic impedance and having one end thereof terminated in an impedance approximately equal to said characteristic impedance, and a second transmission line of an odd number of quarter-wave lengths and having a characteristic impedance equal to the geometric mean impedances of said first transmission line and said wave guide for coupling said first transmission line between said structure and said conductor, whereby said wave guide is terminated in its image impedance and optimum transfer of wave-signal energy through said wave guide is effected from said wave guide to said first transmission line.

10. A wave-guide system for translating wave signals of predetermined wave length comprising, an open wave guide including a linear conductor spaced by at least one-quarter wave length from any conductive mass, an electrically conductive structure positioned at the end of said conductor in coaxial relation therewith but in spaced relation therefrom and providing normal thereto a wave-signal path having impedance to space much less than the image impedance of said wave guide, a first coaxial transmission line having a predetermined characteristic impedance, and a second coaxial transmission line of an odd number of quarter-wave lengths and having a characteristic impedance equal to the geometric mean impedances of said first transmission line and said wave guide for coupling said first transmission line between said structure and said conductor to effect optimum transfer of wave-signal energy through said wave guide in at least one direction.

11. A wave-guide system for translating wave signals of predetermined wave length comprising, an open wave guide including an elongated conductor spaced by at least one-quarter wave length from any conductive mass, an electrically conductive structure providing normal to said conductor a wave-signal path having impedance to space much less than the image impedance of said wave guide, wave-signal translating apparatus having an input circuit coupled to one end of said transmission line and having an input circuit impedance approximately equal to said characteristic impedance, and a second transmission line of an odd number of quarter wave lengths and having a characteristic impedance equal to the geometric mean impedances of said first transmission line and said wave guide for coupling said first transmission line between said structure and said conductor, whereby said wave guide is terminated in its image impedance and optimum transfer of wave-signal energy is effected through said wave guide in the direction toward said wave-signal apparatus.

12. A wave-guide system for translating wave signals of predetermined wave length comprising, an open wave guide including a linear conductor spaced by at least one-quarter wave length from any conductive mass, an electrically conductive structure surrounding said conductor but spaced therefrom and providing normal thereto a wave-signal path having impedance to space much less than the image impedance of said wave guide, wave-signal translating apparatus, impedance-matching transmission-line means utilizing a length of said conductor extending from said structure on the opposite side thereof from the path of wave-signal propagation along said conductor for providing a transmission line short-circuited a number of half-wave lengths distant from said structure, and a transmission line having a predetermined characteristic impedance coupled between said wave-signal translating apparatus and a point on said transmission-line means which point is spaced an odd number of quarter-wave lengths from said structure, said transmission-line means having a characteristic impedance equal to the geometric mean impedances of said last-mentioned transmission line and said wave guide for effecting optimum transfer of wave-signal energy through said wave guide in at least one direction.

13. A wave-guide system for translating wave signals of predetermined wave length comprising, an open wave guide including a shielded transmission line having an outer conductive shield spaced by at least one-quarter wave length from any conductive mass, an electrically conductive structure surrounding said shield but spaced therefrom and providing normal thereto a wave-signal path having impedance to space much less than the image impedance of said wave guide, means utilizing a length of said shield extending from said structure on the opposite side thereof from the path of wave-signal propagation along said shield for providing a coaxial transmission line short-circuited an odd number of quarter wave lengths distant from said structure, and means for coupling an inner conductor of said first transmission line to the outer conductor of said last-mentioned transmission line to effect a transfer of wave-signal energy between said first transmission line and said wave guide.

14. A wave-guide system for translating wave signals of predetermined wave length comprising, an open wave guide including a shielded transmission line having an outer conductive shield spaced by at least one-quarter wave length from any conductive mass, an electrically conductive structure surrounding said shield but spaced therefrom and providing normal thereto a wave-signal path having impedance to space much less than the image impedance of said wave guide, means utilizing a length of said shield extending from said structure on the opposite side thereof from the path of wave-signal propagation along said shield for providing a coaxial transmission line short-circuited an odd number of quarter wave lengths distant from said structure, resistive means having a value of resistance approximately matching said image impedance for coupling said structure and said shield to effect optimum transfer of wave-signal energy through said wave guide in at least one direction, and means for coupling an inner conductor of said first transmission line to the outer conductor of said last-mentioned transmission line to effect a transfer of wave-signal energy between said first transmission line and said wave guide.

15. A wave-guide length for translating wave signals of predetermined wave length comprising, an open wave guide including a coaxial transmission line having an outer conductor spaced by at least one-quarter wave length from any conductive mass, an electrically conductive structure providing normal to said conductor a wave-signal path having impedance to space much less than the image impedance of said wave guide, and impedance means having a value of impedance equal approximately to the geometric mean impedance of said transmission line and said wave guide for coupling the inner conductor of said transmission line and said structure to effect optimum transfer of wave-signal energy between said transmission line and said wave guide in at least one direction.

HAROLD A. WHEELER.

REFERENCES CITED

The following references are of record in the file of this patent:

UNITED STATES PATENTS

| Number | Name | Date |
|---|---|---|
| 1,766,041 | Kolster | June 24, 1930 |
| 2,168,860 | Berndt | Aug. 8, 1939 |
| 2,267,951 | Roosenstein | Dec. 30, 1941 |
| 2,297,513 | Von Baeyer | Sept. 29, 1942 |

FOREIGN PATENTS

| Number | Country | Date |
|---|---|---|
| 107,564 | Australia | June 8, 1939 |